(12) United States Patent
Amaya

(10) Patent No.: US 9,016,357 B2
(45) Date of Patent: Apr. 28, 2015

(54) HEADER PLATE AND HEAT EXCHANGER COMPRISING SAME

(75) Inventor: Luis Amaya, Le Mesnil-Saint-Denis Cedex (FR)

(73) Assignee: Valeo Systemes Thermiques, Le Mesnil Saint Denis, Cedex (FR)

( * ) Notice: Subject to any disclaimer, the term of this patent is extended or adjusted under 35 U.S.C. 154(b) by 491 days.

(21) Appl. No.: 12/935,346

(22) PCT Filed: Mar. 27, 2009

(86) PCT No.: PCT/EP2009/002276
§ 371 (c)(1),
(2), (4) Date: Dec. 10, 2010

(87) PCT Pub. No.: WO2009/121531
PCT Pub. Date: Oct. 8, 2009

(65) Prior Publication Data
US 2011/0088884 A1    Apr. 21, 2011

(30) Foreign Application Priority Data

Mar. 31, 2008 (SE) ...................................... 0800716

(51) Int. Cl.
*F28F 9/02* (2006.01)
*F28F 9/04* (2006.01)
(Continued)

(52) U.S. Cl.
CPC ............... *F28F 9/04* (2013.01); *F02B 29/0462* (2013.01); *F28D 2021/0082* (2013.01); *F28F 9/182* (2013.01); *Y02T 10/146* (2013.01)

(58) Field of Classification Search
CPC ......... F28F 9/02; F28F 9/0202; F28F 9/0221; F28F 9/0241; F28F 9/0229
USPC .......................... 165/173, 175, 176, 158, 149; 29/890.038, 890.043
See application file for complete search history.

(56) References Cited

U.S. PATENT DOCUMENTS 2,298,996 A * 10/1942 Woods ........................... 165/149
2,573,161 A * 10/1951 Tadewald ...................... 165/153
(Continued)

FOREIGN PATENT DOCUMENTS

DE           3924180 A  *  2/1990
DE          19757034 A1    6/1999
(Continued)

OTHER PUBLICATIONS

English language abstract for DE 19757034 extracted from espacenet.com database Mar. 21, 2011, 7 pages.
(Continued)

*Primary Examiner* — Tho V Duong
(74) *Attorney, Agent, or Firm* — Howard & Howard Attorneys PLLC

(57) ABSTRACT

The invention concerns a header plate, preferably for a heat exchanger, such as water cooled charge air cooler (WCCAC), comprising a coolant housing having two opposing walls made up from two header plates (11, 12), which are made of sheet metal of a defined thickness (t). The header plates (11, 12) form parts of air tanks and are passed by air tubes extending through said coolant housing from one of said header plates (11, 12) to the other. The header plates (11, 12) have stamped apertures (15), in which said air tubes are inserted and tightly connected to the header plate sheet metal. The apertures (15) have peripheral rims (22), which protrude on one side of the header plate (11, 12) in question and give an extra support to the air tubes inserted in the apertures (15) of said header plate (11, 12). The distance (da) between adjacent apertures (15) and thus the distance (dt) between adjacent air tubes is less than two times the thickness (t) of the header plate sheet metal.

9 Claims, 2 Drawing Sheets

(51) Int. Cl.
  *F02B 29/04* (2006.01)
  *F28F 9/18* (2006.01)
  *F28F 9/16* (2006.01)
  *F28D 21/00* (2006.01)

(56) References Cited

U.S. PATENT DOCUMENTS

| | | | | |
|---|---|---|---|---|
| 3,245,465 A * | 4/1966 | Young | ............................ | 165/148 |
| 3,489,209 A * | 1/1970 | Johnson | ........................ | 165/133 |
| 3,724,537 A * | 4/1973 | Johnson | ........................ | 165/133 |
| 3,993,126 A * | 11/1976 | Taylor | ............................ | 165/173 |
| 4,625,793 A * | 12/1986 | Cadars | ........................... | 165/151 |
| 5,228,512 A * | 7/1993 | Bretl et al. | .................... | 165/153 |
| 6,212,250 B1 * | 4/2001 | Korton et al. | ................. | 376/261 |
| 2006/0048759 A1 | 3/2006 | Hendrix et al. | | |
| 2006/0118285 A1 | 6/2006 | Emrich et al. | | |
| 2006/0137867 A1* | 6/2006 | Hayashi et al. | ............... | 165/158 |

FOREIGN PATENT DOCUMENTS

| | | | |
|---|---|---|---|
| DE | 10302708 A1 | | 7/2004 |
| EP | 1707911 A1 | | 10/2006 |
| GB | 2048451 A | * | 12/1980 |
| JP | 63233297 A | * | 9/1988 |
| JP | 05322475 A | | 12/1993 |
| WO | WO 2004090454 A | | 10/2004 |
| WO | WO 2007050461 A | | 5/2007 |

OTHER PUBLICATIONS

English language abstract for DE 10302708 extracted from espacenet.com database Mar. 21, 2011, 14 pages.

English language abstract for EP 1707911 extracted from espacenet.com database Mar. 21, 2011, 13 pages.

English language translation and abstract for JP 05-322475 extracted from PAJ database Mar. 21, 2011, 44 pages.

English language abstract for WO 2004-090454 extracted from espacenet.com database Mar. 21, 2011, 25 pages.

PCT International Search Report for PCT/EP2009/002276, dated Sep. 9, 2009, 3 pages.

* cited by examiner

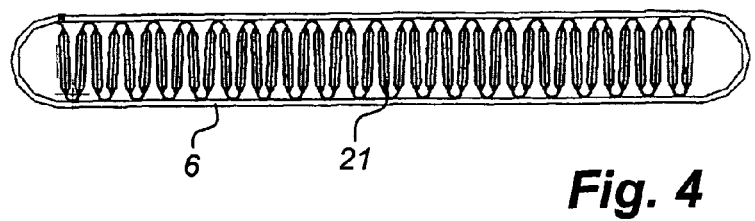
Fig. 4
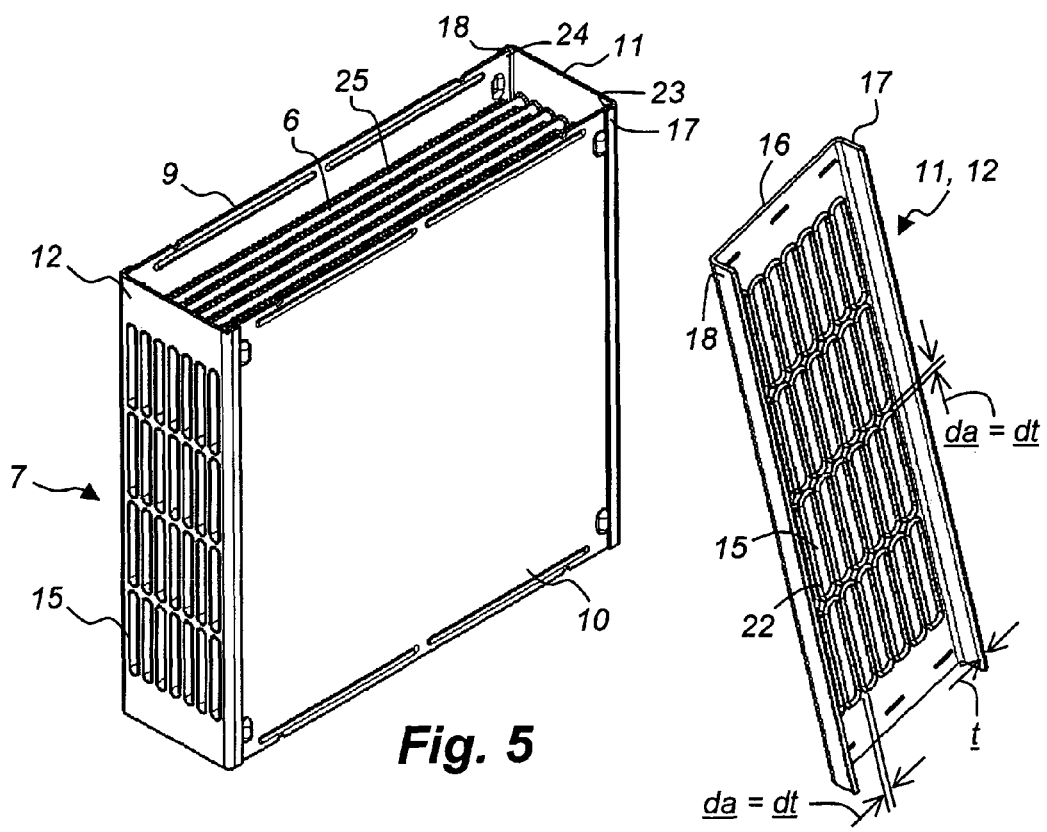
Fig. 5
Fig. 6
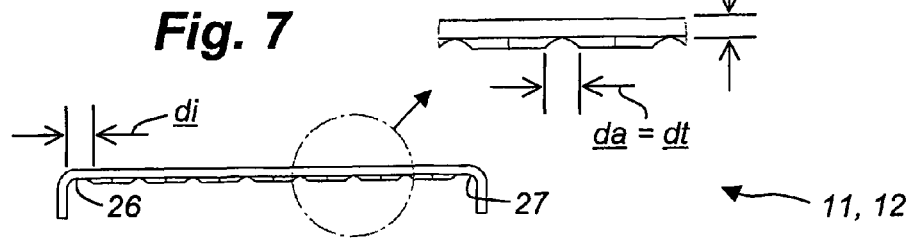
Fig. 7

HEADER PLATE AND HEAT EXCHANGER COMPRISING SAME

RELATED APPLICATIONS

This application claims priority to and all the advantages of International Patent Application No. PCT/EP2009/002276, filed on Mar. 27, 2009, which claims priority to Sweden Patent Application No. SE0800716-3, filed on Mar. 31, 2008.

TECHNICAL FIELD

The invention concerns a header plate and a heat exchanger comprising same. The header plate as such is made of sheet metal of a defined thickness and has apertures stamped therein for receiving air tubes suitable to be inserted in the header plate. The heat exchanger comprises a coolant housing passed by a plurality of air tubes, which are inserted in and attached to apertures in at least one such header plate.

PRIOR ART

A heat exchanger comprising header plates according to the preamble and intended for combustion engines is known from the German patent application DE 103 02 708 A1. In that document the header plates are intended to hold a plurality of flat air tubes, which are arranged in parallel with each other with narrow long sides facing a main coolant flow and wide long sides in a side by side configuration. The ends of each air tube are inserted in and tightly attached to stamped apertures of opposing header plates of an inlet air tank and an outlet air tank, respectively. The header plates in their turn are tightly attached to a coolant casing comprising four walls, which together with said header plates form a parallel-epipedic coolant housing. The coolant housing has a coolant inlet and a coolant outlet, which are provided on one of the casing walls, and further it comprises coolant guiding means as well as coolant turbulating means, the latter ones being arranged at least between the wide long sides of adjacent air tubes passing through said housing.

In order to facilitate the attachment of the header plates to said casing and to ensure tightness, such that no coolant can enter either air tank and lead to engine failure, the known header plates have peripheral flanges providing safe contact between the header plates and said casing. However, there are no extra means for facilitating the attachment of the air tubes to the header plates and to ensure tightness between these parts other than an adaptation of the stamped apertures and the air tubes to each other and, of course, the traditional brazing of the junctions between these. Thus, during production great attention has to be given to the brazing process in order to bring down rejection levels, and later on in use great effort has to be put on vibration damping in order to avoid weakening of said junctions.

OBJECT OF THE INVENTION

Against that background the object of the invention is to improve the previous header plate design by eliminating the drawbacks of the prior art, especially when it comes to production friendliness and durability, and thus to render an improved heat exchanger possible.

SHORT SUMMARY OF THE INVENTION

This object is achieved by the apertures of the header plate having peripheral rims, which protrude on one side of the header plate and give an extra support to the air tubes when these are inserted in the apertures of said header plate, and by the distance between adjacent apertures and thus the distance between adjacent air tubes being less than two times the thickness of the header plate sheet metal. It is obvious that the peripheral rims provided according to the invention not only give an extra support to the air tubes, but also facilitate their fixture during production and create a larger contact area for durable brazing. Further, in order to keep down dimensions to normal according to the invention the rims due to a certain stretching while they are being stamped have a lesser wall thickness than the header plate as such, thus making it possible to minimise the distance between adjacent air tubes.

According to a one embodiment the apertures are oblong, said distance between adjacent apertures and thus the distance between adjacent air tubes being measured between the long sides of the oblong apertures and thus between the wider sides of adjacent air tubes and/or between the short sides of the oblong apertures and thus between the narrower sides of adjacent air tubes. In a case where the air tubes are flat, this is the preferred design.

In a preferred embodiment said header plate is channel-shaped having a centre web, in which said apertures are provided, and flanges extending along said centre web. The advantage of that solution is that the flanges not only facilitate attachment of the header plates to other parts, e.g. of a coolant housing, but also directs possible leakage of coolant from said coolant housing away from the air tanks, into which the air tubes debouch.

According to a further embodiment the rims of said apertures and said flanges protrude on the same side of the header plate, wherein the distance between an inner face of either flange and apertures adjacent to said inner face is less than three times the thickness of the header plate sheet metal. This solution is favourable especially when housing walls of about the same thickness as the header plate are arranged inside of said flanges, making it possible to use the same kind of turbulating means between the air tubes as such and between said housing walls and the adjacent air tubes.

In the further embodiment insertion spaces are preferably provided between said flanges and rims of adjacent apertures for receiving edge portions of casing walls. In that way assembly of a unit in which a header plate according to the invention is included can be simplified.

It is obvious to the person skilled that it is advantageous if the header plate and the air tubes are clad and pre-fluxed in order to be brazeable in an oven after insertion of the air tubes into said apertures.

According to another embodiment of the invention a heat exchanger is provided, comprising a coolant housing passed by a plurality of air tubes, wherein air tubes are inserted in and attached to rimmed apertures in at least one header plate according to any one of the embodiments in the foregoing. A heat exchanger comprising preferably two such header plates can be of a very compact design and yet provide for high durability.

According to one embodiment the coolant housing of the heat exchanger comprises two opposing side walls made up from two header plates, wherein on at least one of the two header plates the rims of the apertures protrude from said at least one header plate on the header plate side turned away from the opposite header plate. This solution leads to a somewhat higher flow resistance for charge air entering the air tubes, but provides for a minimum flow resistance for coolant passing along the header plates inside the coolant housing.

According to another embodiment the coolant housing of the heat exchanger comprises two opposing side walls made up from two header plates, wherein on at least one of the two header plates the rims of the apertures protrude from said at least one header plate on the header plate side facing the opposite header plate. This solution leads to a somewhat higher flow resistance for coolant passing along the header plates inside the coolant housing, but provides for a minimum flow resistance for charge air entering the air tubes.

BRIEF DESCRIPTION OF THE DRAWINGS

The invention is described in detail below with reference to the schematic drawings.

In the drawings:

FIG. 4 is an end view of a flat air tube;

FIG. 5 is an isometric view of a heat exchanger according to a second embodiment with parts thereof removed for clarity;

FIG. 6 is an isometric view of a header plate according to said second embodiment; and FIG. 7 is an end view of a header plate according to the second embodiment.

DESCRIPTION OF TWO EMBODIMENTS

Figures 1, 2, 3:
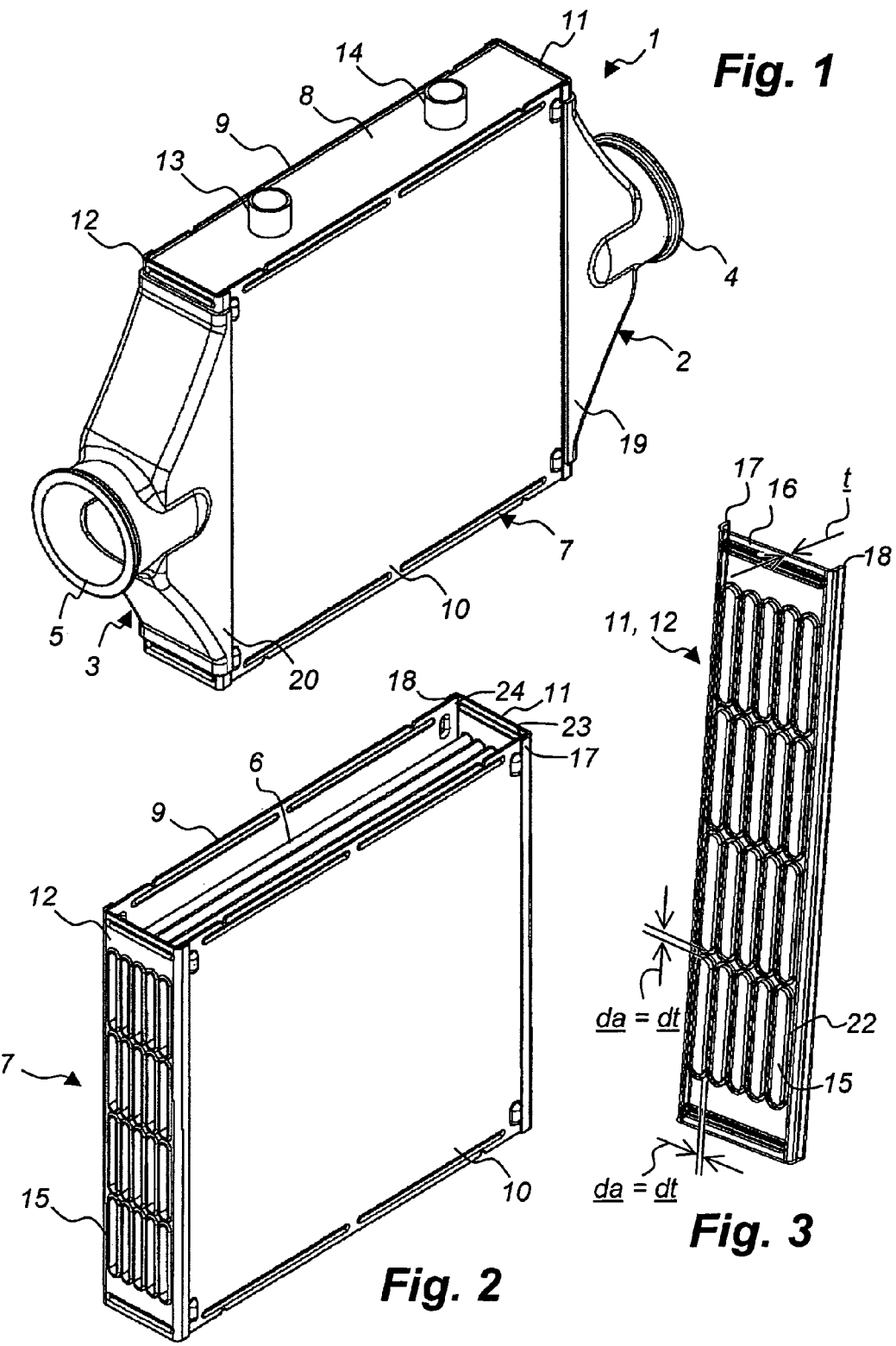
FIG. 1 is an isometric view of a heat exchanger according to the invention.
FIG. 2 is an isometric view of a heat exchanger according to a first embodiment with parts thereof removed for clarity.
FIG. 3 is an isometric view of a header plate according to said first embodiment.

The heat exchanger 1 shown in FIG. 1 is a so called WCCAC, which stand for Water Cooled Charge Air Cooler. It is used to cool charge air led to an engine intake with the aid of a coolant mainly comprising water. The coolant is usually shared with the engine as such, which renders it possible to use the engine cooling radiator to cool the WCCAC as well.

In WCCACs an important issue is to avoid leakage of coolant into the charged air led to the engine, because otherwise engine failure would be the consequence. Therefore it is of utmost importance to guarantee absolute fluid tightness between the air side and the coolant side of a WCCAC. In the heat exchanger 1 shown in FIG. 1 the air side consists of two air tanks 2, 3 with an air inlet 4 and an air outlet 5, respectively, and of a plurality of air tubes, which are shown in FIGS. 2, 4 and 5 and designated 6. They are described in further detail below. The coolant side of the heat exchanger 1 in FIG. 1 consists of a coolant housing 7, which is of an parallelepipedic shape and comprises a bottom wall (not shown), a top wall 8, two opposing wide side walls 9, 10, and two opposing narrow side walls 11, 12 (c.f. FIGS. 2 and 5), all walls preferably being made of a brazeable sheet metal, such as aluminium. The bottom wall and the wide side walls 9, 10 are all closed, and in said top wall 8 there are only a coolant inlet 13 and a coolant outlet 14, which are to connected to an engine cooling circuit. The narrow side walls 11, 12 on the other hand comprise a plurality of oblong apertures 15, which are provided for the air tubes 6. Thus, the narrow side walls 11, 12 do not only form part of the coolant side of the heat exchanger 1, but also part of the air side of the heat exchanger 1. They do it by being used as so called header plates of said air tanks 2, 3. Therefore, in the remainder of this description and in the claims the air tank header plates will be designated 11 and 12.

The header plates 11, 12, which are shown in two different embodiments in FIGS. 2 and 3 and FIGS. 5 to 7, are channel shaped, having a centre web 16 between two opposite flanges 17, 18. The flanges 17, 18 are arranged to encompass edges of the wide side walls 9, 10 and in their turn to be encompassed by cowlings 19, 20, forming part of the air tanks 2, 3. In each header plate 11, 12 shown there are a number of oblong apertures 15, which are arranged in groups of several oblong apertures 15 on top of each other with the narrow sides of the oblong apertures 15 facing each other. Thus, in each group there are several oblong apertures 15 with their long sides facing each other.

The oblong apertures 15 are provided for interconnection with said air tubes 6. These are of a flat design and have in section (c.f. FIG. 4) an oblong shape too just like the oblong apertures 15. The air tubes 6 are made of a brazeable sheet metal, such as aluminium, and have turbulators 21 for the charged air inside. They are arranged in groups in a manner dictated by the oblong apertures 15, and inside the coolant housing 7 they have their narrow long sides facing a main coolant flow and their wide long sides in contact with coolant turbulators 25 (shown in FIG. 5 only) interposed between the air tubes 6 and between the air tubes 6 and the wide side walls 9, 10 of the coolant housing 7.

Here, the heat exchanger 1 is a multi-rows exchanger. In other words, the header plates 11, 12 are provided with apertures 15 arranged, for instance, in five rows of oblong apertures 15, each rows comprising, in this example, four oblong apertures 15.

In order to rule out leakage between the air tubes 6 and the header plates 11, 12, and thus between the air side and the coolant side of the heat exchanger 1, and yet to render an easy fit and compact design possible, according to the invention the oblong apertures 15 in the header plates 11, 12 are shaped clearly different from usual. Thus, according to the invention oblong apertures 15 have peripheral rims 22, which protrude on one side of the header plate 11, 12 in question and give an extra support to the air tubes 6 inserted in the oblong apertures 15 of said header plate 11, 12. Further, according to the invention, the distance da between adjacent oblong apertures 15 and thus the distance dt between adjacent air tubes 6 is less than two times the thickness t of the header plate sheet metal (c.f. FIGS. 3, 6 and 7). This is accomplished by stamping the oblong apertures 15 in a way that leads to stretching and thus thinning of the sheet metal of said rims 22, e.g. by means of a minute anvil die in between two apertures 15 to be stamped. A particular embodiment proposes that the distance da (i.e. less than two times the thickness t of the header plate sheet metal) is met between all adjacent tubes 6/apertures 15 of the header plate of the heat exchanger. In other words, two tubes 6/apertures 15 adjacent in a specific row of tubes/apertures and two adjacent tubes 6/apertures 15 in vis-à-vis belonging to two adjacent rows of tubes/apertures are distant to each other by the same distance da. In more other words, the distance da is respected between each adjacent tubes/apertures of the header plates 11, 12.

Typically the header plates 11, 12 are made of a clad and prefluxed aluminium sheet with a thickness of 2.2 mm, although for lighter loads a thickness of 1.5 mm and for heavier loads a thickness of 3 mm or even more is possible. In the typical case this could lead to a distance da of e.g. 4 mm, for the thinner sheet of 1.5 mm to a distance da of e.g. 2.8 mm and for the thicker sheet of 3 mm to a distance da of e.g. 5.5 mm.

In FIG. 3 and FIGS. 6 and 7 two preferred embodiments of header plates 11, 12 are shown. The embodiment in FIG. 3 comprises rims 22 protruding from the header plate 11, 12 on the header plate side opposed to the side with the flanges 17, 18. Contrary to that the embodiment in FIGS. 6 and 7 comprises rims 22 protruding from the header, plate 11, 12 on the same side of the header plate as the flanges 17, 18. It is obvious to the person skilled in the art that the former embodiment favours coolant flow, and that the latter embodiment favours air flow instead.

It is obvious that the invention described so far can be altered in different ways within the scope of the appendant claims. Thus, the rims 22 may be used for other types of air tubes than flat ones, and, if they protrude into a coolant housing 7, to support walls, such as the wide side walls 9, 10, from inside by providing insertion spaces 26, 27 (c.f. FIG. 7). Further it is obvious that header plates 11, 12 of different kinds may be provided in one and the same heat exchanger 1.

The invention claimed is:

1. A header plate (11, 12) made of sheet metal of a defined thickness (t), the header plate (11, 12) comprising:
   oblong stamped apertures (15) for receiving air tubes (6) suitable to be inserted into the header plate (11, 12), said apertures (15) having peripheral rims (22);
   wherein the sheet metal of said header plate (11, 12) around a periphery of said stamped apertures (15) forms the peripheral rims (22), which protrude on one side of the header plate (11, 12) and give an extra support to the air tubes (6) when these are inserted in the apertures (15) of said header plate (11, 12); and
   a distance (da) between of adjacent apertures (15) and thus a distance (dt) between adjacent air tubes (6) is less than two times the defined thickness (t) of of the sheet metal of said header plate (11, 12), wherein said distance (da) between adjacent apertures (15) and thus the distance (dt) between adjacent air tubes (6) is measured between short sides of the oblong apertures (15) and thus between narrower sides of adjacent air tubes (6), said peripheral rims (22) having a wall thickness less than the defined thickness of said header plate (11, 12).

2. A header plate (11, 12) according to claim 1, wherein said header plate (11, 12) is channel-shaped having a centre web (16), in which said apertures (15) are provided, and flanges (17, 18) extending along said centre web (16).

3. A header plate (11, 12) according to claim 2, wherein the rims (22) of said apertures (15) and said flanges (17, 18) protrude on the same side of the header plate (11, 12) and wherein the distance (di) between an inner face of either flange (17, 18) and apertures (15) adjacent to said inner face is less than three times the thickness (t) of the header plate sheet metal.

4. A header plate according to claim 3, wherein insertion spaces (26, 27) are provided between said flanges (17, 18) and rims (22) of adjacent apertures (15) for receiving edge portions (23, 24) of casing walls (9, 10).

5. A header plate (11, 12) according to claim 1, wherein said header plate (11, 12) and the air tubes (6) are clad and pre-fluxed in order to be brazeable in an oven after insertion of the air tubes (6) into said apertures (15).

6. A heat exchanger (1) comprising a coolant housing passed by a plurality of air tubes (6), characterized in that said air tubes (6) are inserted in and attached to rimmed apertures (15) in at least one header plate (11, 12) according to claim 1.

7. A heat exchanger (6) according to claim 6, wherein said coolant housing (7) comprises two opposing side walls made up from two header plates (11, 12), wherein on at least one of the two header plates (11, 12), the rims (22) of the apertures (15) protrude from said at least one header plate (11, 12) on the header plate side turned away from the opposite header plate (11, 12).

8. A heat exchanger (1) according to claim 6, wherein said coolant housing (7) comprises two opposing side walls made up from two header plates (11, 12), wherein on at least one of the two header plates (11, 12) the rims (22) of the apertures (15) protrude from said at least one header plate (11, 12) on the header plate side facing the opposite header plate (11, 12).

9. A heat exchanger (1) according to claim 6, wherein the heat exchanger (1) is a multi-rows exchanger and wherein the distance (da) between adjacent apertures (15) is the same between all adjacent apertures (15) of the header plate (11, 12).

* * * * *